(12) United States Patent
Jansen et al.

(10) Patent No.: US 7,316,115 B1
(45) Date of Patent: Jan. 8, 2008

(54) MEANS AND METHOD FOR CONTROLLING A HYDROMECHANICAL TRANSMISSION IN DUAL MODE

(75) Inventors: Lynn T Jansen, Ames, IA (US); Michael D. Gandrud, Ames, IA (US)

(73) Assignee: Sauer-Danfoss Inc., Ames, IA (US)

( * ) Notice: Subject to any disclaimer, the term of this patent is extended or adjusted under 35 U.S.C. 154(b) by 226 days.

(21) Appl. No.: 11/029,871

(22) Filed: Jan. 5, 2005

(51) Int. Cl.
*F16D 31/02* (2006.01)
(52) U.S. Cl. ........................................ 60/487
(58) Field of Classification Search ................... 60/487
See application file for complete search history.

(56) References Cited

U.S. PATENT DOCUMENTS

| | | | |
|---|---|---|---|
| 4,370,856 A * | 2/1983 | Ito et al. ...................... 60/444 |
| 4,463,559 A * | 8/1984 | Holdenried .................. 60/444 |
| 4,531,431 A * | 7/1985 | Dreher et al. ................. 60/438 |
| 5,337,629 A | 8/1994 | Kita |
| 5,413,540 A | 5/1995 | Streib et al. |
| 5,846,156 A | 12/1998 | Meissner et al. |
| 6,135,917 A | 10/2000 | Takizawa et al. |
| 6,595,885 B1 | 7/2003 | Lutgen |
| 6,663,532 B1 | 12/2003 | McIndue et al. |
| 2003/0010026 A1 | 1/2003 | Evans et al. |
| 2004/0038772 A1 | 2/2004 | McIndue et al. |

* cited by examiner

*Primary Examiner*—F. Daniel Lopez

(57) ABSTRACT

A system for operating a hydromechanical transmission having a movable input member that transmits a signal to a control unit that uses predefined logic to determine if a hydrostatic transmission should be in a first low speed mode that uses displacement control or if it should be in a second high speed mode that uses a power, torque, or speed control scheme.

14 Claims, 2 Drawing Sheets

MEANS AND METHOD FOR CONTROLLING A HYDROMECHANICAL TRANSMISSION IN DUAL MODE

BACKGROUND OF THE INVENTION

This invention is directed to an improved method of controlling low speed and "creeping" performance of machines that use hydrostatic transmissions in propel applications. More specifically, the present invention is directed to a method of improved control for industrial trucks and forklift trucks that use hydrostatic transmissions to transmit power from an internal combustion engine to the wheels of the machine.

Forklift trucks are used for purposes such as the loading and unloading of transportation vehicles, the stacking and transporting of goods through warehouses, and for other well known purposes. In the operation of a fork lift truck, the ability of an operator to control precise movements of the truck is critical. This precise or creeping movement is especially important when positioning the fork into a load and when positioning a load into location. As such operators expect machines to allow accurate positioning of a payload with a precision of less than a centimeter.

This capability of controlling creeping performance is currently available in battery powered industrial trucks. This quality of controlling creeping performance may also be available on some models of internal combustion engine trucks that use gear based transmissions and torque converters. Unfortunately, the prior art does not teach a satisfactory method to achieve the control of creeping performance and/or quality in internal combustion engine driven industrial trucks using hydrostatic propel transmissions.

One of the reasons pure displacement "mode" transmissions do not perform adequately in forklift applications is that the engines are relatively low power and have flat torque curves. Thus, the traditional displacement mode transmission will cause engine stall at displacements above +/−5% from neutral.

The control system of a hydrostatic industrial truck often consists of an operator input device such as a foot pedal, an electronic controller, and an electrical control such as an "Electronic Displacement Control" on at least one hydrostatic power unit. Several control methods are known in the prior art for the control of hydrostatic transmissions. More specifically, hydrostatic transmissions are sometimes controlled in a displacement control mode. In displacement control, the displacement of a hydrostatic transmission is a direct and normally linear function of the operator's input command. At a given engine speed this will cause the speed of the vehicle to be directly proportional to the foot pedal input command position. Speed, torque, and power control schemes are also well known in the prior art.

Thus, a problem exists in the art in that when a hydrostatic transmission is used in a device such as a forklift that needs low speed and creeping performance, the transmission does not have a means to provide for this low speed performance and at the same time provide a second control scheme for other working conditions. Consequently, there is a need in the art for a control system that is able to detect the desired operating mode of a forklift and cause the hydrostatic transmission to perform in that mode so that the correct control scheme is being used by the forklift for the task at hand.

Thus, it is a primary object of the present invention to provide a control system for a hydromechanical transmission that will place the transmission in a first mode for low speed applications and a second mode for high speed applications.

Another object of the present invention is to provide an operating system for a hydromechanical transmission that allows a forklift to operate in a first mode that is a displacement control mode and also in a second mode that is a different control scheme.

Yet another object of the present invention is to provide a forklift or truck that may be operated in multiple modes using only a single foot pedal.

Another object of the present invention is to provide for a device that will allow an operator to select the control scheme of a forklift.

These and other objects, features, or advantages of the present invention will become apparent from the specification and claims.

BRIEF SUMMARY OF THE INVENTION

The present invention is a system for operating a hydromechanical transmission that uses a movable input member that transmits a signal based on displacement of the member to a control unit. The control unit uses an algorithm to interpret the signal and then actuates a hydrostatic transmission accordingly. The hydrostatic transmission has a first mode that has a low speed displacement control and has a second mode that provides for a high speed control. Such high speed control schemes include a speed control, a torque control, or a power control scheme. Thus, the present invention teaches a control method which detects the desired operating mode (displacement, torque, speed, power) for a machine and automatically controls the hydrostatic propel system using a predefined control logic.

DESCRIPTION OF THE PREFERRED EMBODIMENTS OF THE INVENTION

Figure 1:
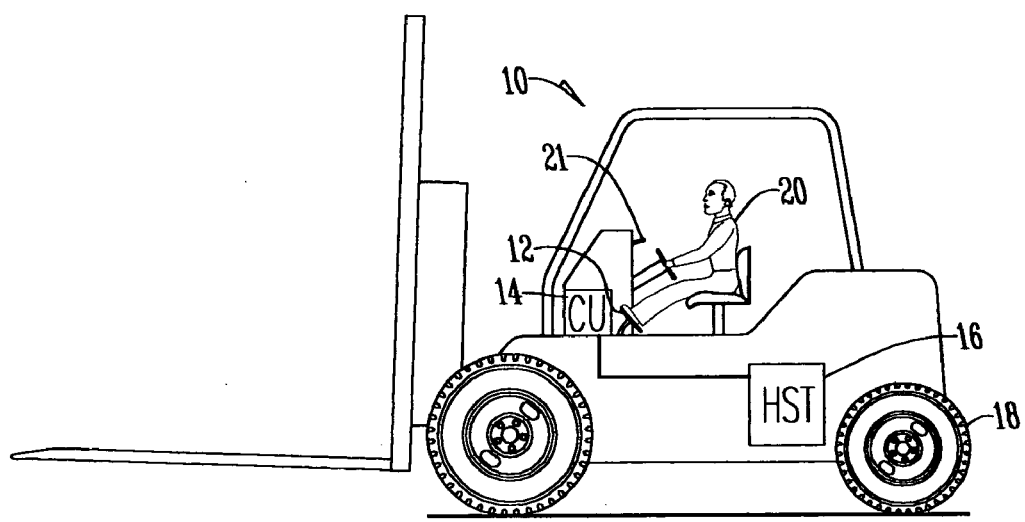
FIG. 1 is a perspective view of a forklift using the control system of the present invention.

FIG. 1 shows a forklift 10 that possesses the control system of the present invention. One skilled in the art will understand that this control system can work on any machine such as a forklift or truck and a forklift 10 is only being used as an example. The control system has three main parts; a movable input member 12 such as a foot pedal, a control unit 14, and a hydrostatic transmission 16. The control unit 14 can be electrically connected to a foot pedal 12 and hydrostatic transmission 16 or may be connected by wireless communication. The transmission 16 operates to drive the wheels 18 of forklift 10 depending on the position of the input member 12 that is controlled by an operator 20.

The hydrostatic transmission 16 is designed to contain a plurality of modes as is well known in the art. In the hydrostatic transmission of the present invention, the first mode is a displacement control for low speed applications while the second mode uses a control scheme that provides for high speed applications. These control schemes include a speed control, a torque control, and a power control scheme. One skilled in the art will understand that the dual mode hydrostatic transmission of the present invention has a first low speed that uses a displacement control and a second high speed that uses any one of the speed, torque, or power control schemes. Additionally, a person skilled in the art will understand the various ways in which a transition from one mode of operation to another are accomplished within the control unit 14.

Additionally, a second input device 21 may be connected to the control unit 14 that allows an operator 20 to choose the second operating mode control scheme. For example, an operator by using the second input 21 will be able to manually place the hydrostatic transmission in a torque control when the control unit 14 places the transmission 16 into its second mode. Optionally, the operator 20 could also place the control scheme of the second mode in a power control or a ground speed control scheme. Thus, an operator may manually control the control scheme of the second mode by using the second input device 21.

Figure 2:
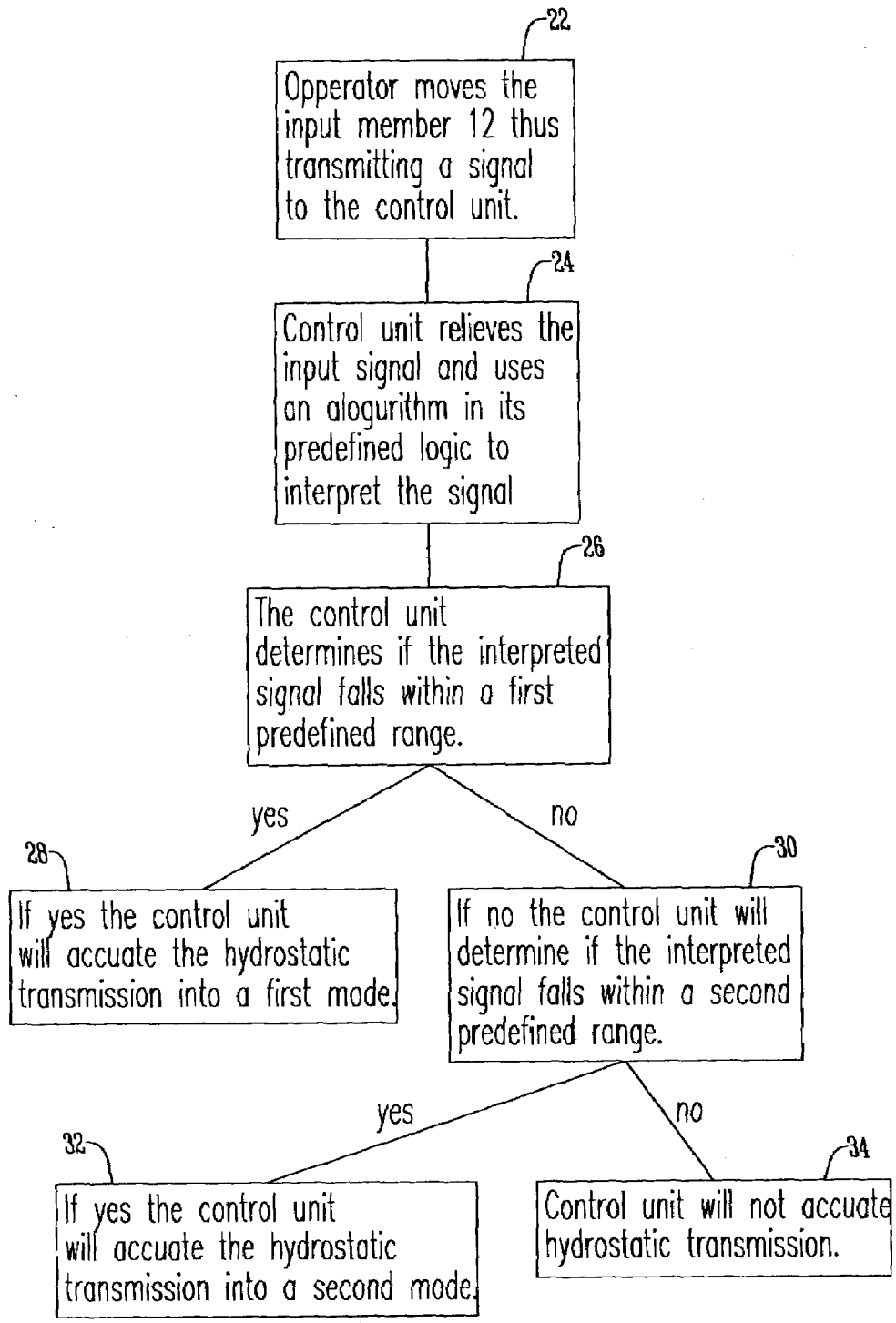
FIG. 2 is an flow diagram showing the method of operation of the present invention.

FIG. 2 shows a flow chart that defines the method of operation of the present invention. As seen in block 22, when operator 20 (FIG. 1) displaces the input member 12 a signal is transmitted to the control unit 14. Then, as seen in box 24, the control unit 14 receives the input signal and uses an algorithm in its predefined logic to interpret the signal. Then, as seen in box 26, the control unit by using the predefined logic determines if the signal transmitted by the input member falls within a first predefined range. As an example, the predefined range may be ±5% from the input member 12's neutral position. If the interpreted signal falls within this first predefined range as seen in box 26, the control unit 14 will actuate the hydrostatic transmission to place it in its first control mode. Thus, when the first mode is a displacement control mode for low speed applications, the forklift 10 will creep as desired. If, on the other hand, the control unit determines that the interpreted signal does not fall within the first predefined range then the control unit will determine if the interpreted signal falls within a second predefined range, as is shown in box 30. For example, if the control unit 14 determines that the input member 12 has moved away from its neutral position by ±5% to ±95% the control unit 14 will then place the hydrostatic transmission 16 in a second mode as indicated by box 32. If the interpreted signal does not fall within either the first predefined range nor the second predefined range, then the control unit 14 will not actuate the hydrostatic transmission 16.

One skilled in the art will appreciate that the ±5% for the first predefined range and the ±5 to 95% for the second predefined ranged is merely exemplary and thus, different ranges can be used. For example, the first predefined range could be for ±15% of the displacement of the input member 12 while the second predefined range could be for displacement at ±15% to ±50%. In either case, the initial displacement of the input member 12 causes creeping or low speed actuation in a first mode and the second predefined range causes the control unit 14 to place the hydrostatic transmission 16 in a second mode for high speed operations. Thus, the present invention teaches a control method which detects the desired operating mode (displacement, torque, speed, power) and automatically controls the hydrostatic propel system using a predefined control logic.

In one embodiment of the present invention the first increment or predefined range of operator control input will control the displacement of the hydrostatic transmission 16. In this embodiment, larger input signals of the operator control will be converted into a torque command of the hydrostatic transmission 16. For example, the machine might be equipped with a foot pedal 12 that the machine operator 20 uses to control the velocity of the machine. For the first ±5% of foot pedal 12 movement either way from its neutral position, the control system will use this signal to command the displacement of the hydrostatic transmission 16. For movement of ±5% to ±95% of the foot pedal 12, the control unit 14 will control the torque applied to the wheels 18 of the machine 10.

In an alternative embodiment of the present invention the first increment of operator control input will control the displacement of the hydrostatic transmission. In this embodiment, larger input signals of the operator control will be converted into a speed command of the hydrostatic transmission 16. For example, the machine might be equipped with a foot pedal 12 that the machine operator 20 used to control the velocity of the machine 10. For the first ±5% of foot pedal 12 movement either way from its neutral position, the control unit 14 will use this signal to command the displacement of the hydrostatic transmission 16. For movement of ±5% to ±95% of the foot pedal 12, the control unit 14 will control the ground speed applied to the wheels 18 of the machine 10.

In another embodiment of the present invention the first increment of operator control input will control the displacement of the hydrostatic transmission. In this embodiment, larger input signals of the operator control will be converted into a power command of the hydrostatic transmission 16. For example, the machine might be equipped with a foot pedal 12 that the machine operator uses to control the velocity of the machine 10. For the first ±5% of foot pedal 12 movement either way from its neutral position, the control system will use this signal to command the displacement of the hydrostatic transmission 16. For movement of ±5% to ±95% of the foot pedal 12, the control unit 14 will control the power applied to the wheels 18 of the machine 10.

Therefore, one skilled in the art will appreciate that a control system for a hydromechanical transmission that allows for a single controller that places the hydrostatic transmission in a first mode for low speeds and in a second mode for high speeds has been disclosed. One skilled in the art will also appreciate that this application allows for the operator of a device to manually choose what the control scheme of the high speed second mode will be. One skilled in the art will also appreciate that the system of the present invention provides for improved creeping speed and is able to use a displacement control in conjunction with other control speeds in order to improve the control and use of a forklift or truck. Consequently, all of the stated objectives have been met.

It will be appreciated by those skilled in the art that other various modifications could be made to the device without the parting from the spirit in scope of this invention. All such modifications and changes fall within the scope of the claims and are intended to be covered thereby.

What is claimed is:

1. A system for operating a hydromechanical transmission comprising:

a movable input member that transmits a displacement signal based upon displacement of the moveable input member;

a control unit connected through wireless communication to the moveable input member that determines a position of the input member based upon the displacement signal;

a hydrostatic transmission connected to the control unit;

said hydrostatic transmission being in one of a first mode that is a displacement control or a second mode based upon the determined position of the input member; and a second input connected to the control unit for determining the operation of the mode;

wherein the determined operation of the second mode is chosen from a control strategy consisting of the group torque control, power control, and speed control.

2. The system of claim 1 wherein the control unit is connected to the moveable input member electrically.

3. The system of claim 1 wherein the movable input member is a foot pedal.

4. The system of claim 1 wherein the second mode is a torque control.

5. The system of claim 1 wherein the second mode is a power control.

6. The system of claim 1 wherein the second mode is a speed control.

7. The system of claim 1 wherein an operator manually controls the operation of the second input.

8. The system of claim 1 wherein the hydromechanical transmission operates in the first mode when the determined position of the input member is within a first predefined range.

9. The system of claim 8 wherein the hydromechanical transmission operates in the second mode when the determined position of the input member is within a second predefined range.

10. A method of operating a hydrostatic transmission comprising the steps of:

providing a movable input member for receiving an operator input based upon displacement of the movable input member;

transmitting a signal based upon the operator input to a control unit;

actuating a hydrostatic transmission to operate in a first mode that is a displacement control when the input member is in a first predefined range and a second mode when the input member is in a second predefined range based upon the operator input; and providing a second input connected to the control unit to provide manual control of the second mode;

wherein an operator chooses the second mode from a plurality of control strategies, by using the second input; wherein one of the plurality of control strategies is a torque control mode and another of the plurality of control strategies is a non-torque control mode.

11. The method of claim 10 wherein the movable input member is a foot pedal.

12. The method of claim 10 wherein the non-torque control mode is a power control.

13. The method of claim 10 wherein the non-torque control mode is a speed control.

14. A method of operating a hydrostatic transmission comprising the steps of:

providing a movable input member for receiving an operator input based upon displacement of the movable input member;

transmitting a signal based upon the operator input to a control unit;

actuating a hydrostatic transmission to operate in a first mode that is a displacement control when the input member is in a first predefined range and a second mode when the input member is in a second predefined range based upon the operator input; and providing a second input connected to the control unit to provide manual control of the second mode;

wherein the second mode is a control strategy consisting of the group torque control, power control, and speed control; and wherein an operator chooses a control strategy to be used within the second mode by using the second input.

* * * * *